Sept. 25, 1923.
H. E. ANDERSON
BRAKE OPERATING MECHANISM
Filed Aug. 5, 1921  2 Sheets-Sheet 2
1,468,691
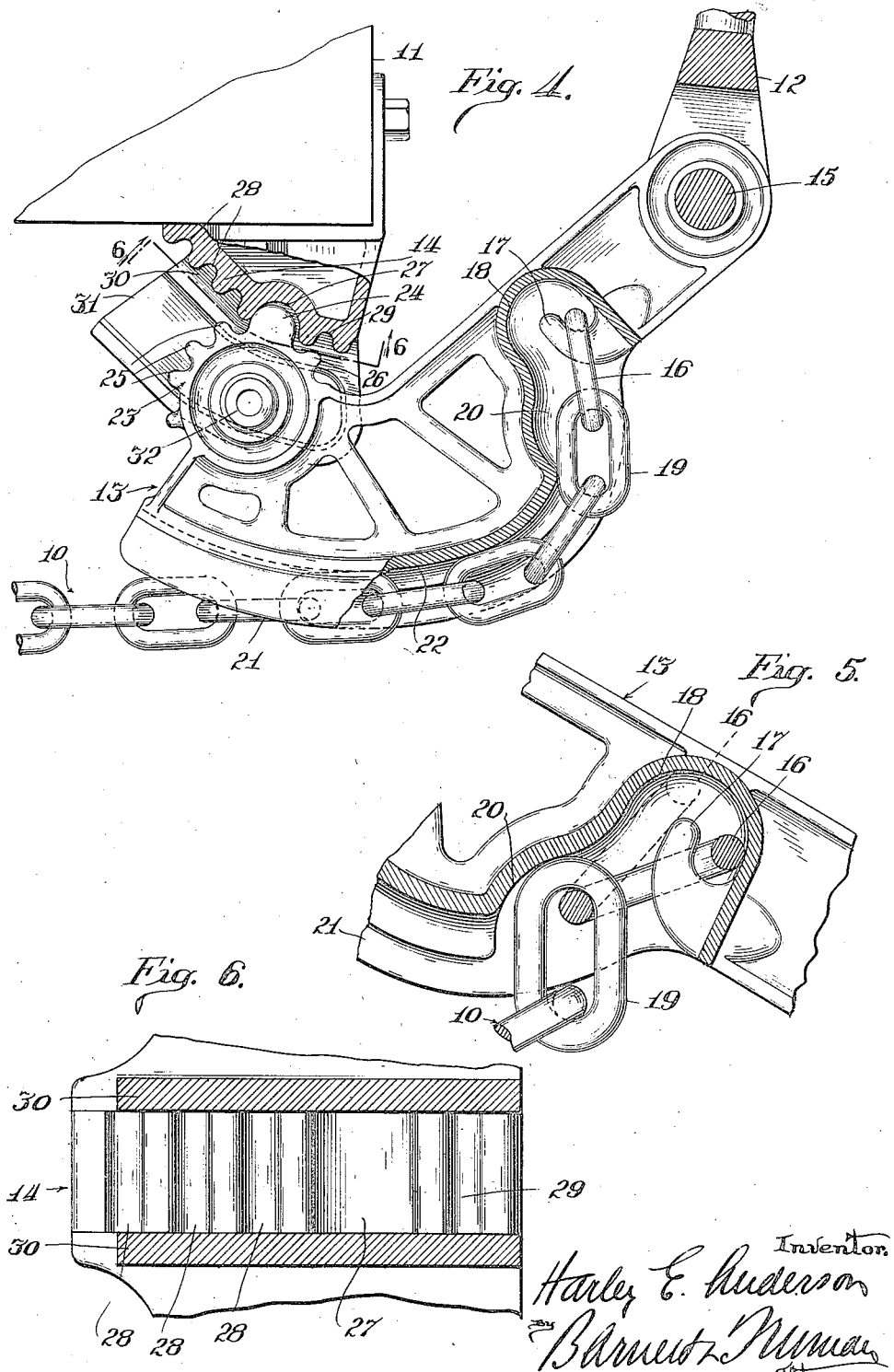

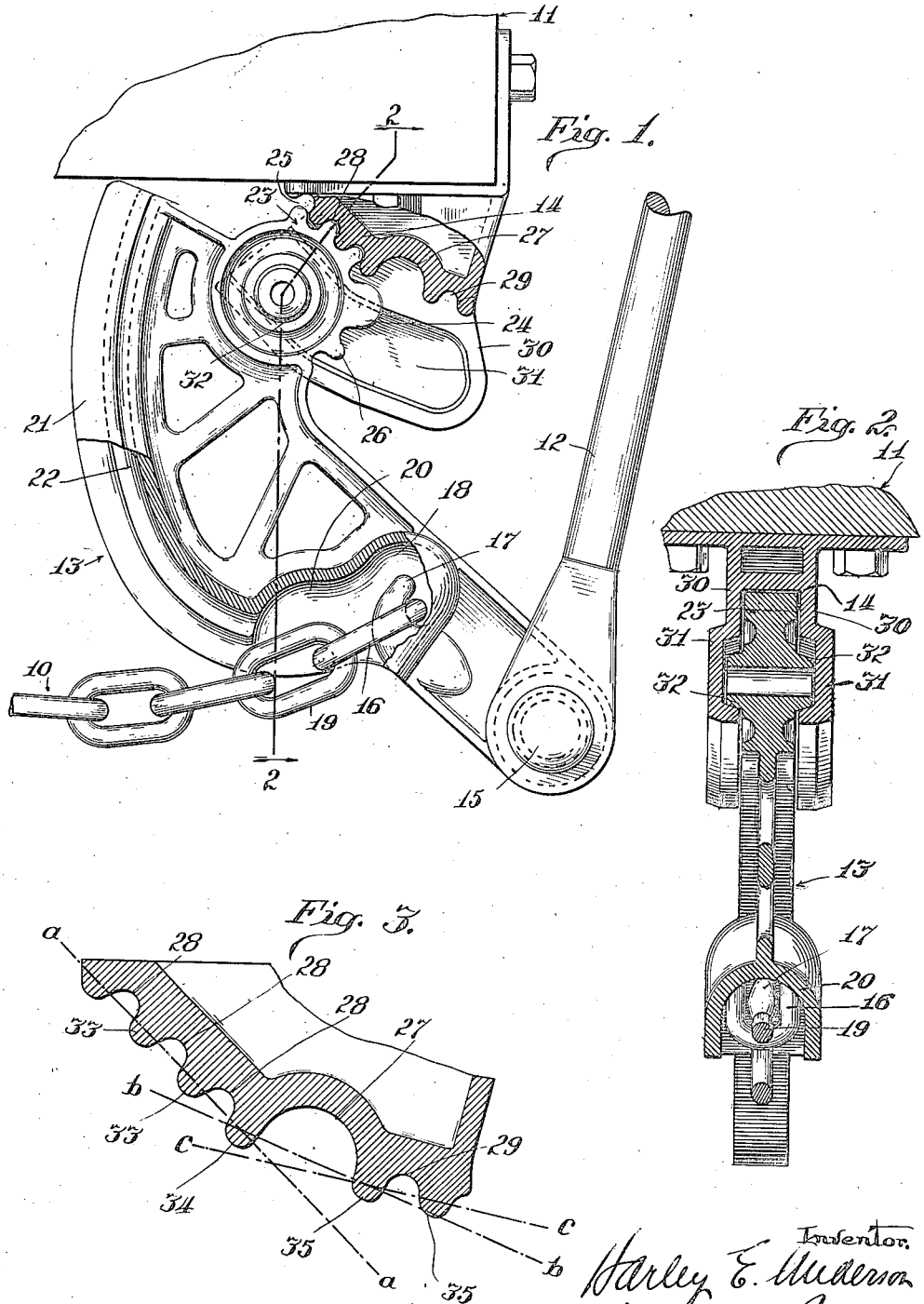

Patented Sept. 25, 1923.

1,468,691

UNITED STATES PATENT OFFICE.

HARLEY E. ANDERSON, OF CHICAGO, ILLINOIS, ASSIGNOR, BY MESNE ASSIGNMENTS, TO AMERICAN HAND BRAKE COMPANY, OF CHICAGO, ILLINOIS, A CORPORATION OF ILLINOIS.

BRAKE-OPERATING MECHANISM.

Application filed August 5, 1921. Serial No. 490,079.

*To all whom it may concern:*

Be it known that I, HARLEY E. ANDERSON, a citizen of the United States, residing at Chicago, in the county of Cook and State of Illinois, have invented certain new and useful Improvements in Brake - Operating Mechanism, of which the following is a specification.

This invention relates to a railway brake operating mechanism of the type involving a horizontal, or substantially horizontal transmission element, preferably a chain or the like, arranged under the car body and connected with and forming part of the brake rigging, a substantially vertical transmission element, preferably a rigid pull rod, means operable by hand for exerting a lifting force upon the rod, and a rolling member or bell crank having a toothed fulcrum travelling on a rack, preferably a downwardly inclined rack, to transmit the pull on the rod to the chain.

The expedient of having the bell crank roll in the direction away from the brakes (and preferably away from the lifting mechanism also) instead of merely pivoting, is to increase the rapidity with which the slack in the chain and other parts of the brake rigging is taken up. After the brake shoes have been brought into contact with the wheels no advantage is obtained from a rolling movement of the bell crank, but, on the contrary, a continued rolling movement is distinctly a disadvantage, first, because it involves a progressive shortening of the lever arm to which the power is applied, and, second, because the opposed stresses to which the bell crank is subjected during the operation of setting the brakes are of such magnitude as to disturb the normal meshing relationship of the teeth on the bell crank with those on the rack. If, for example, the lever arm of the bell crank with which the brake rigging is connected is shorter, effectively, than the arm to which the power is applied, the bell crank will be pulled backwardly on the rack, producing at the time when braking force is applied to the wheels a friction between the teeth on the bell crank and those on the rack which tends to mutilate and wear away the teeth and which decreases by so much the power applied to the brake shoes. One of the primary objects of my invention is to provide an improved construction of the bell crank and the rack with which it cooperates in accordance with which the rolling movement of the bell crank occurring when the slack is being taken up, is changed to a rotary movement on a fixed or substantially fixed axis and with heavier parts and larger surfaces in contact during the brake setting operation, whereby all of the above stated objections are obviated.

A further object of the invention is to provide a novel and improved device for fastening the brake rigging chain to the bell crank without the use of a removable pin bolt or like part which, if it is capable of being removed, may be lost, or when injured, replaced by a part of less than the required strength.

The invention consists of the new and improved constructions, arrangements and devices, to be hereinafter described and claimed, for carrying out the above stated objects, and such other incidental objects as will be referred to in the following description of the preferred embodiment of the invention shown in the drawing.

In the drawing—

Fig. 1 is a side elevation, with certain parts in section, of a power transmission mechanism for brake manipulating apparatus constructed in accordance with the invention; the parts being shown in their normal position with the brakes released;

Fig. 2 is a sectional view on line 2—2 of Fig. 1;

Fig. 3 is a diagram illustrating the principles of construction of the rack on which the bell crank rolls;

Fig. 4 is a view similar to Fig. 1, but showing the parts in the position they assume when the brakes are set;

Fig. 5 is a fragmentary sectional view, showing the way in which the brake rigging chain is attached to the bell crank; and Fig. 6 is a sectional view, on line 6—6 of Fig. 4, omitting the bell crank, to show the construction of the rack.

Referring to the drawing, 10 designate a chain which is arranged under the body of the car 11 and forms a part of the mechanism, consisting of brake beams, levers, links and the like, hereinafter referred to as the brake rigging, for forcing the brake shoes against the wheels of the car. 12 is a pull rod which is raised by means of any suitable power applying mechanism (not shown). 13 is a bell crank or rocking member which rolls upon a rack 14 fixed to the car body. The pull rod 12 is pivoted at 15 to the bell crank. The last link 16 of chain 10 engages an integral hook 17 on the bell crank. Fig. 5 illustrates the way in which the chain is attached to the bell crank. When slack the links are flexed as shown, so that link 16 will pass into the recess 18 in the bell crank, the next link 19 standing endwise in recess 20. Link 16 is then turned and slipped over the hook. When this connection has been made, the weight of the chain when slack, and its engagement with the bell crank when wound thereon, prevents disengagement from the hook. And this will be so even if the car is turned upside down in dumping, as is the practice with some cars.

The bell crank is provided with a curved portion 21 formed with a channel 22 which receives the chain 10 when the bell crank is rocked, the chain being flexed over or wound upon this part of the bell crank. Preferably the channelled portion 18 of the bell crank is formed on a curve which gradually approaches the rack 14. That is, the curvature of the surface over which the chain 10 winds is such as to, in effect, shorten the lever arm to which the chain is attached as the bell crank approaches the brake setting position, thereby giving increased power at a time when power is essential and amplitude of movement is unimportant.

The bell crank is formed with a segmental spur pinion 23 having one large tooth 24 and on opposite sides of the same smaller teeth 25, 26. The rack member 14 has a corresponding toothed configuration providing a large groove or recess 27 for tooth 24 and smaller grooves or recesses 28, 29 for the teeth 25, 26, respectively. The rack member 14 is formed with retaining flanges 30 for the bell crank, said flanges being off-set at 31 to provide recesses for studs 32 on the bell crank.

The preferred configuration of the toothed portion of the rack is indicated in the diagram designated Fig. 3. The pitch line $a$—$a$ of the teeth 33, 33 at the upper end of the rack is preferably at an angle of 45° from the horizontal; the pitch line $b$—$b$ of the next tooth 34 is preferably at 35° from the horizontal; and the pitch line $c$—$c$ of the teeth 35, 35 at the lower end of the rack has an inclination of 15° from the horizontal. These pitch line angles might be changed without departure from my invention. The expedient of having a single relatively large tooth on the bell crank might be employed without any change in pitch line inclination as between the two sets of teeth with the sacrifice of certain advantages as will hereafter appear.

The purpose of having the bell crank roll and furthermore giving the rack on which it rolls a downward inclination toward the end of the car, is to obtain as rapid a take-up as possible in the slack of the brake rigging precedent to setting the brakes. When, however, the slack has been taken up and the shoes have been brought into contact with the wheels, if the rolling movement is continued, especially if it is continued downwardly at the same sharp inclination, a loss of power will result due to the consequent shortening of the lever arm on which pull rod 12 operates and because of the tendency of the spur gear on the bell crank to bind against the rack and develop excessive friction. Furthermore, if the leverages of the arms of the bell crank are not equal, the tendency will be to crowd the teeth of the bell crank against the teeth of the rack, producing a wear of the teeth which engage at the time of the setting operation, that in time may interfere with the rolling movement of the bell crank. For example, if the lever arm with which the chain 10 connects is shorter than that to which power is applied, the bell crank, due to the unequal forces to which it is subjected, may be pulled backwardly and downwardly from the rack, so that were the teeth uniform, those that are intended to engage during the brake setting operation might not mesh at all, or might be jammed one against the other with an excessive and destructive friction. To obviate these conditions, the spur pinion on the bell crank is formed with the large tooth 24 arranged to engage the groove 27 of corresponding size at approximately the point the slack in the brake connections is taken up. After the tooth 24 has seated in groove 27 the bell crank ceases to roll, for a time, and pivots on tooth 24, this pivotal movement being of considerable amplitude because of the change in the angle of the pitch line of the teeth 35, 35. This pivotal movement involves no shortening of the lever arm to which the power is applied, and the larger size of the tooth and the groove which it engages provides for a better bearing, as against back thrust, and minimizes wear on the parts. By lessening the angularity of pitch line $b$—$b$ in comparison with $a$—$a$, the groove 27 is thrown in deeper behind tooth 34, so that a better abutment for tooth 24 is provided as against back pull. It is, of course, true that the amount of slack to be taken up will differ for different installations. The amount of rotational movement of the bell crank, however, is slight after the slack has been taken up. By making the tooth 24 of large enough diameter and properly positioning it on the spur gear, the slack in the brake connections for average installations at least, will be fully taken up at some position of the bell crank intermediate the limits of its pivotal movement on tooth 24, so that the apparatus is accommodated to installations having a greater or less amount of slack to be taken up before the brakes begin to set. In most cases, in fact, the tooth 26 on the bell crank and the corresponding teeth 35 of the rack could be dispensed with. The mechanism, however, is preferably constructed as shown so as to have a factor of safety for installations in which the slack may be excessive. In such case, however, the slight inclination of the pitch line of the rack at its outer end assures an easing of the action of the bell crank on the rack, although not to the same extent as the action is eased during the pivotal movement of the bell crank on the large tooth 24.

I claim:

1. In brake operating mechanism, the combination of members angularly disposed with respect to one another and each movable in substantially the direction of its length, and an element for transmitting power from one of said members to the other which has a rolling movement during the take-up of slack in the brake connections, and a pivotal movement on a fixed axis while the brakes are being set.

2. In brake operating mechanism, the combination of members angularly disposed with respect to one another and each movable in substantially the direction of its length, and an element for transmitting power from one of said members to the other which has a rolling movement along a path inclined downwardly and away from the brakes during the take-up of the slack in the brake rigging, and a pivotal movement on a fixed axis while the brakes are being set.

3. In brake operating mechanism, the combination of members angularly disposed with respect to one another and each movable in substantially the direction of its length, an element for transmitting power from one of said members to the other formed with a spur pinion having a tooth which is larger than the other teeth thereof, and a rack of corresponding configuration with which said spur pinion is engaged.

4. In brake operating mechanism, the combination of members angularly disposed with respect to one another and each movable in substantially the direction of its length, an element for transmitting power from one of said members to the other formed with a spur pinion having a tooth which is larger than the other teeth thereof, and a rack of corresponding configuration for engagement by said spur pinion, which rack is inclined downwardly and away from the brakes.

5. In brake operating mechanism, the combination of members angularly disposed with respect to one another and each movable in substantially the direction of its length, an element for transmitting power from one of said members to the other formed with a spur pinion having a tooth which is larger than the other teeth thereof, and a rack of corresponding configuration for engagement by said spur pinion, which rack is inclined downwardly and away from the brakes, the inclination of said rack being greater at its upper end than at its lower end.

6. In brake operating mechanism, the combination of members angularly disposed with respect to one another and each movable in substantially the direction of its length, a rack on the car having two sets of teeth and a groove between said sets of teeth larger than the groove between the several teeth of each set, and an element for transmitting power from one of said members to the other formed with a spur pinion having one tooth of larger size than the others to engage said larger groove in the rack.

7. In brake operating mechanism, the combination of members angularly disposed with respect to one another and each movable in substantially the direction of its length, a rack on the car having two sets of teeth formed on pitch lines of different inclination, a recess between said sets of teeth larger than the recess between the several teeth of each set, and an element for transmitting power from one of said members to the other formed with a spur pinon having one tooth of larger size than the others to engage said larger recess in the rack.

8. In brake operating mechanism, the combination of a substantially vertical pull rod on the outside of the car, a flexible member forming part of the brake rigging, a rack inclined downwardly and outwardly on the under side of the car, an element with which said pull rod and flexible member are connected formed with a spur pinion to engage said rack, said spur pinion being formed with a tooth larger than the others and the rack with a correspondingly formed recess to receive said tooth at approximately the point in the operation of the apparatus at which the brake shoes are brought into contact with the wheels of the car.

9. In brake mechanism, the combination of angularly disposed members, and an element for transmitting power from one of said elements to the other which rolls during the first part of its movement in one direction and thereafter pivots on a fixed axis.

10. In brake operating mechanism, the combination of a substantially vertical member movable in substantially the direction of its length, a chain under the car body, and a rocking element on the car connected with said vertical member and formed with an integral hook to engage said chain and with a curved surface over which the chain is flexed.

11. In brake operating mechanism, the combination of a rocking member formed with a recess, means for rocking the said member, a chain forming part of the brake rigging, and a hook on the rocking member for engagement by the chain which is arranged to project into said recess so that the chain will remain engaged therewith during all its normal movements.

12. In brake operating mechanism, the combination of a rocking member formed with a recess on its under side and with an integral hook projecting upwardly into said recess, means for rocking said element, and a chain forming part of the brake rigging adapted to be engaged with said hook.

13. In brake operating mechanism, the combination with a chain forming part of the brake rigging, of a rocking member on which the chain winds, which member is formed on the under side with an upwardly projecting, integral hook engaged by said chain.

14. In brake operating mechanism, the combination with a chain forming part of the brake rigging, of a rocking member on which the chain winds, which member is formed on the under side with a recess to receive the last two links of the chain, and with an upwardly extending integral hook projecting into said recess for engagement by the last link of the chain.

15. In brake operating mechanism, the combination with a chain forming part of the brake rigging, of a rocking member formed with a hook adapted to be engaged by the end link of said chain, said member and hook being formed so that they are engageable and disengageable only by turning the next to the last link so that it stands at an angle to said last link.

16. In brake operating mechanism, a power transmitting device comprising a rack, a movable element formed with a pinion to engage said rack, said rack and pinion being formed one with a tooth larger than the other teeth thereon and the other with a recess of corresponding size which are in engagement while the brakes are being set.

17. In brake operating mechanism, a power transmitting device comprising an element which has a rolling movement during the take-up of slack in the brake connections and a pivotal movement while the brakes are being set.

18. In brake operating mechanism, a power transmitting device comprising an element which has a rolling movement downwardly and away from the brakes during the take-up of slack in the brake connections and a pivotal movement while the brakes are being set.

19. In brake operating mechanism, a power transmitting device comprising an inverted, inclined rack element, a rocking and rolling element provided with a pinion to engage the rack, the upper portion of the rack, and the corresponding portion of the pinion, being formed with relatively small teeth, one of said elements being formed at a point beyond said small teeth with a larger tooth and the other element with a corresponding groove into which said larger tooth fits rotatably.

20. In brake operating mechanism, a power transmitting device comprising an inverted, inclined rack formed at its upper end with relatively small teeth and below the same with a large rounded recess, and a movable element formed with small teeth to engage the small teeth on the rack and a larger tooth to fit rotatably into said recess.

21. In brake operating mechanism, a power transmitting device comprising an inverted, inclined rack formed at its upper end with relatively small teeth and below the same with a large rounded recess, and a movable element formed with small teeth to engage the small teeth on the rack and a larger tooth to fit rotatably into said recess, the tooth on the rack above said recess having a pitch line at an angle to the horizontal less than the pitch line of the other teeth above said recess.

22. In a brake operating mechanism, a power transmitting device comprising an inverted, inclined rack formed at its upper and lower ends with relatively small teeth, the pitch line of the teeth at the upper end being at a greater angle to the horizontal than the pitch line of the teeth at the lower end, and with a relatively large recess between said sets of teeth, and a movable element formed with two sets of small teeth to engage the sets of small teeth on the rack, respectively, and between the same a large tooth adapted to engage rotatably the aforesaid recess of the rack.

23. In a brake operating mechanism, a power transmitting device comprising an inverted, inclined rack formed at its upper and lower ends with relatively small teeth, the pitch line of the teeth at the upper end being at a greater angle to the horizontal than the pitch line of the teeth at the lower end, and with a relatively large recess between said sets of teeth, and a movable element formed with two sets of small teeth to engage the sets of small teeth on the rack, respectively, and between the same a large tooth adapted to engage rotatably the aforesaid recess on the rack, the pitch line of the tooth on the rack just above said recess standing at an angle to the horizontal less than that of the upper teeth and greater than that of the lower teeth.

24. In brake mechanism, the combination of angularly disposed members, an element for transmitting power from one of said elements to the other formed with a pinion, said rack and pinion being formed one with a tooth larger than the remaining teeth thereof and the other with a corresponding recess and the rack being formed at the place of bearing as between the large tooth and its recess so as to allow a pivotal movement of said element when the large tooth engages its recess.

25. In brake mechanism, the combination of angularly disposed members, an element for transmitting power from one of said elements to the other formed with a pinion, said rack and pinion being formed one with a tooth larger than the remaining teeth thereof and the other with a corresponding recess and the rack teeth on opposite sides of the place of bearing as between said large tooth and recess having pitch lines at an angle to each other, for the purpose specified.

26. In brake mechanism, the combination of two members, an element for transmitting power from one member to the other having a pinion and a rack engaged by said pinion, said rack and pinion being formed so that when the pinion reaches a certain point in its travel along the rack it has a pivotal movement thereon.

27. In brake mechanism, the combination of two members, an element for transmitting power from one member to the other having a pinion and a rack engaged by said pinion, said rack and pinion being formed with intermeshing teeth of substantially uniform size and with means whereby at one point of travel of the pinion on the rack the pinion turns on the rack with the aforesaid teeth on the pinion and rack out of engagement with each other.

HARLEY E. ANDERSON.